(12) United States Patent
Gacanin

(10) Patent No.: US 9,450,643 B2
(45) Date of Patent: Sep. 20, 2016

(54) METHOD AND APPARATUS FOR RELAYING MESSAGES IN A PLC NETWORK

(71) Applicant: Alcatel Lucent, Boulogne-Billancourt (FR)

(72) Inventor: Haris Gacanin, Antwerp (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/437,922

(22) PCT Filed: Nov. 12, 2013

(86) PCT No.: PCT/EP2013/073547
§ 371 (c)(1),
(2) Date: Apr. 23, 2015

(87) PCT Pub. No.: WO2014/076047
PCT Pub. Date: May 22, 2014

(65) Prior Publication Data
US 2015/0263784 A1      Sep. 17, 2015

(30) Foreign Application Priority Data

Nov. 16, 2012   (EP) .................................... 12306430

(51) Int. Cl.
*H04B 3/36*   (2006.01)
*H04L 25/20*   (2006.01)
*H04B 3/54*   (2006.01)

(52) U.S. Cl.
CPC *H04B 3/36* (2013.01); *H04B 3/54* (2013.01); *H04B 3/542* (2013.01); *H04B 2203/5479* (2013.01)

(58) Field of Classification Search
CPC .......... H04B 3/36; H04B 3/54; H04B 3/542; H04B 2203/5479
See application file for complete search history.

(56) References Cited

U.S. PATENT DOCUMENTS

2004/0223617 A1* 11/2004 Corcoran ................. H04B 3/58
380/266
2010/0073149 A1    3/2010 Goldfisher et al.
(Continued)

FOREIGN PATENT DOCUMENTS

| CN | 2705953 Y | 6/2005 |
|---|---|---|
| JP | 2009510867 A | 3/2009 |
| JP | 2010021954 A | 1/2010 |
| JP | 2011527149 A | 10/2011 |

OTHER PUBLICATIONS

International Search Report PCT/ISA/210 for International Application No. PCT/EP2013/073547 Dated Feb. 24, 2014.
(Continued)

*Primary Examiner* — David B. Lugo
(74) *Attorney, Agent, or Firm* — Harness, Dickey & Pierce, P.L.C.

(57) ABSTRACT

A method for relaying messages in a PLC network including a relay node and at least two end nodes attached to the relay node, the method including at the relay node receiving respective first probing messages from the at least two end nodes; processing the respective first probing messages to generate respective first feedback messages; broadcasting the respective first feedback messages to the at least two end nodes; wherein the first probing messages are formed as orthogonal signals and received substantially simultaneously in a first time slot, and wherein the first feedback messages are formed as orthogonal signals and broadcast substantially simultaneously in a second time slot.

10 Claims, 5 Drawing Sheets

(56) References Cited

U.S. PATENT DOCUMENTS

| | | |
|---|---|---|
| 2010/0278223 A1 | 11/2010 | Riveiro et al. |
| 2011/0249759 A1 | 10/2011 | Riveiro et al. |
| 2012/0082253 A1* | 4/2012 | Varadarajan ............ H04B 3/542 375/260 |

OTHER PUBLICATIONS

Written Opinion of the International Searching Authority PCT/ISA/237 for International Application No. PCT/EP2013/073547 dated Feb. 24, 2014.

* cited by examiner

US 9,450,643 B2

METHOD AND APPARATUS FOR RELAYING MESSAGES IN A PLC NETWORK

FIELD OF THE INVENTION

The present invention pertains to the field of home networking, in particular to feedback protocols used in a power line communication (PLC) network.

BACKGROUND

In home networks, in particular power line communication (PLC) networks, such as those according to the Home-Grid standard, the HomePlug standard, or the G.hn family of Recommendations developed by the ITU-T (see ITU-T Rec. G.9961), it is known to extend the range of communication between network segments by means of repeaters or relays. Such relays typically amplify and repeat received signals.

This architecture has limited scalability and does not allow for true bidirectional interaction across segments or domains. This problem is particularly harmful in the context of multipoint-to-multipoint feedback protocols, in which the total number of interactions scales as the square of the number of nodes involved.

Moreover, when the processing power of the end points is limited by technical constraints (e.g. battery life) or voluntarily (e.g. compliance with voluntary energy efficiency standards), high bit-rate communication via a relay may become impossible.

SUMMARY

It is an object of embodiments of the present invention to provide a method and apparatus that at least partially overcomes these disadvantages.

According to an aspect of the invention, there is provided a method for relaying messages in a PLC network comprising a relay node and at least two end nodes attached to the relay node, the method comprising at the relay node: receiving respective first probing messages from the at least two end nodes; processing the respective first probing messages to generate respective first feedback messages; broadcasting the respective first feedback messages to the at least two end nodes; wherein the first probing messages are formed as orthogonal signals and received substantially simultaneously in a first time slot, and wherein the first feedback messages are formed as orthogonal signals and broadcast substantially simultaneously in a second time slot.

The invention has the advantage of rendering relay-based PLC communication, in particular feedback protocols pertaining to such communication, more efficient by moving processing tasks away from the end nodes towards the relay, and optimizing the messaging between the end nodes and the relay. Thus, the end nodes may be made more energy efficient, allowing them to sustain higher data rates and/or a longer battery life.

In an embodiment, the method according to the present invention further comprises at the relay node: broadcasting a second probing message to the at least two end nodes in a third time slot; and receiving respective second feedback messages from the at least two end nodes; wherein the second feedback messages are formed as orthogonal signals and broadcast substantially simultaneously in a fourth time slot.

In this variant of the invention, the optimization of the messaging is applied to probing/feedback protocols in both directions.

In an embodiment of the method according to the present invention, the probing messages are pilot messages, and the feedback messages comprise bit loading tables.

The invention is particularly useful for this type of messages, because it is an essential part of modern PLC transmission standards, and this process traditionally takes up a significant amount of time during link set-up.

In an embodiment of the method according to the present invention, the first probing messages are formed as orthogonal signals by applying a relative phase/frequency shift.

In an embodiment of the method according to the present invention, the first feedback messages are formed as orthogonal signal by applying a relative phase/frequency shift.

These embodiments take advantage of a particularly efficient way to multiplex messages going in different directions onto the same medium during the same time slot.

In another embodiment of the method according to the present invention, the first feedback messages are formed as orthogonal signal by applying respective spreading codes.

In a particular embodiment, individual ones of the spreading codes are assigned to sets of two end nodes.

These embodiments allow an extension of the advantages of the present invention to situations where there are more than two end nodes attached to the relay. The method is substantially applied independently for each pair of end nodes that can be selected from the total set. The independence of the respective transmissions pertaining to the different pairs can be ensured by code division multiplexing, such that the total number of time slots used does not increase.

According to an aspect of the present invention, there is provided a computer program product comprising code means configured to cause a processor to perform the method described above.

According to an aspect of the invention, there is provided a relay apparatus comprising an interface for exchanging messages with a PLC network and a processor operatively connected to the interface, wherein the processor is configured to carry out the method described above.

According to an aspect of the invention, there is provided a PLC end node adapted for use in the method described above.

The technical effects and advantages of the computer program product, the relay, and the PLC end node according to the present invention correspond, mutatis mutandis, to those of the corresponding embodiments of the method according to the invention.

BRIEF DESCRIPTION OF THE FIGURES

Some embodiments of apparatus and/or methods in accordance with embodiments of the present invention are now described, by way of example only, and with reference to the accompanying drawings, in which.

DESCRIPTION OF EMBODIMENTS

The PLC communication systems described herein are assumed to communicate in discrete time slots, as is specified in detail in the relevant standards. Throughout this application, "substantially simultaneous" transmission of messages will be understood to designate transmission of these messages during the same time slot.

Many types of communication systems rely on feedback information from the remote peer to establish the parameters of the communication. This information may include resource allocation information (bit-loading), channel state information, coding strategy, modulation level, etc. All this information has to be provided to the transmitter to enable efficient two-way communication. The feedback protocols used for this purpose must be sufficiently efficient and robust. In this context, efficiency is to be understood as getting by with the fewest possible transmissions, to minimize the link set-up latency. Particular problems arise with multi-node (relay-assisted) communication, most notably with multipoint-to-multipoint communication.

In home network, the available network resources (e.g., frequency spectrum) are limited by the characteristics of the selected in-house medium and the structure of the network. In the case of power line communication, the medium can be seen as a broadcast channel, where all devices share the same available network resources. Thus, the resources must be optimally and efficiently allocated across all power line communication (PLC) devices.

In a multi-hop environment (with relaying), the resource allocation must take into consideration multi-channel segments between relay and source/destination terminals, which may significantly degrade the achievable performance if some of the channels are having low average power.

Figure 1:
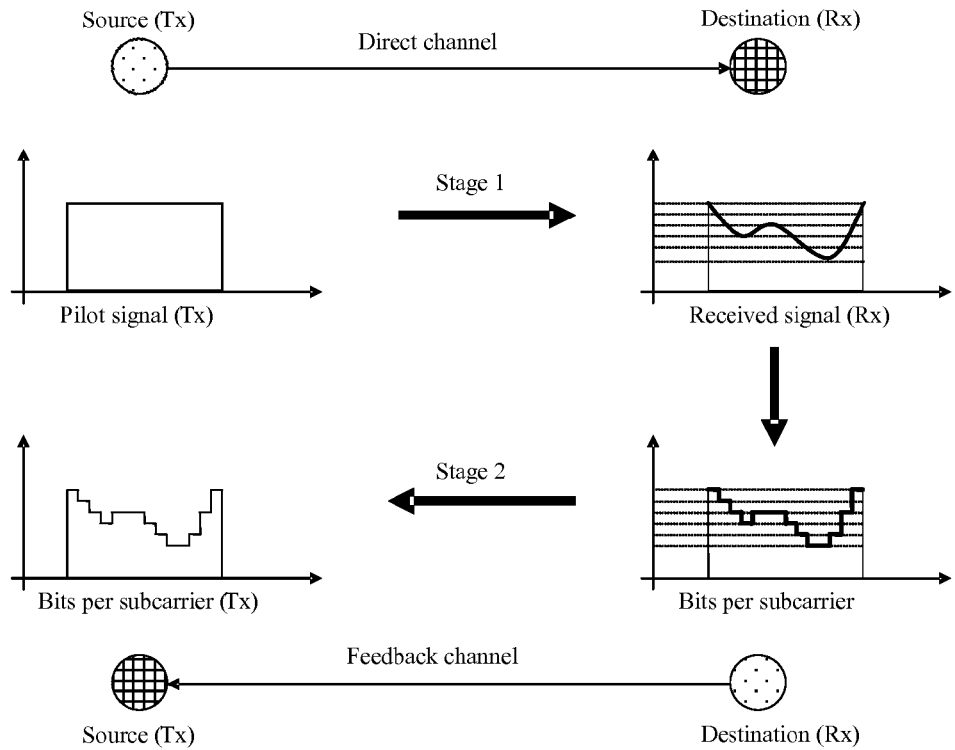
FIG. 1 illustrates a conventional scenario for adaptive bit-allocation in PLC transmitters.
Figure 2:
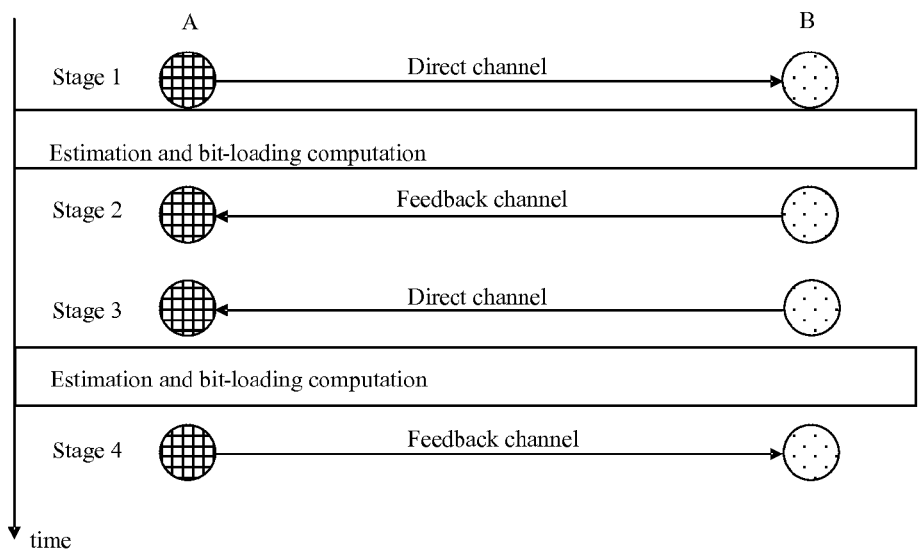
FIG. 2 represents the signaling channels required for a feedback protocol such as the one used in the scenario of FIG. 1.

The conventional scenario for adaptive bit-allocation is illustrated in FIG. 1, while the required signaling channels are represented in FIG. 2. Note that the acknowledgement signals are not illustrated in FIGS. 2 and 3, to keep these figures concise.

The conventional point-to-point feedback protocols, such as those used by bit allocation algorithms that decide the modulation level for each of the subcarriers depending on the estimated signal-to-noise ratio (SNR) or the estimated noise and channel frequency response, can be exemplified by the following summary, with reference to FIG. 1:

1. Device B sends a request for channel estimation to device A.
2. Device A transmits a pilot signal for channel estimation to device B.
3. Device B estimates the noise and channel gain and then, computes the SNR values for each subcarrier/frequency. The estimated SNR is used to compute the bit-loading for each subcarrier based on the pre-defined thresholds. The bit-loading information is sent to device A.
4. Device A acknowledges the correct reception of the information and both devices use the computed bit-loading information.
5. The same processing is done from device B to A in order to obtain a bi-directional communication channel.

Figure 3:
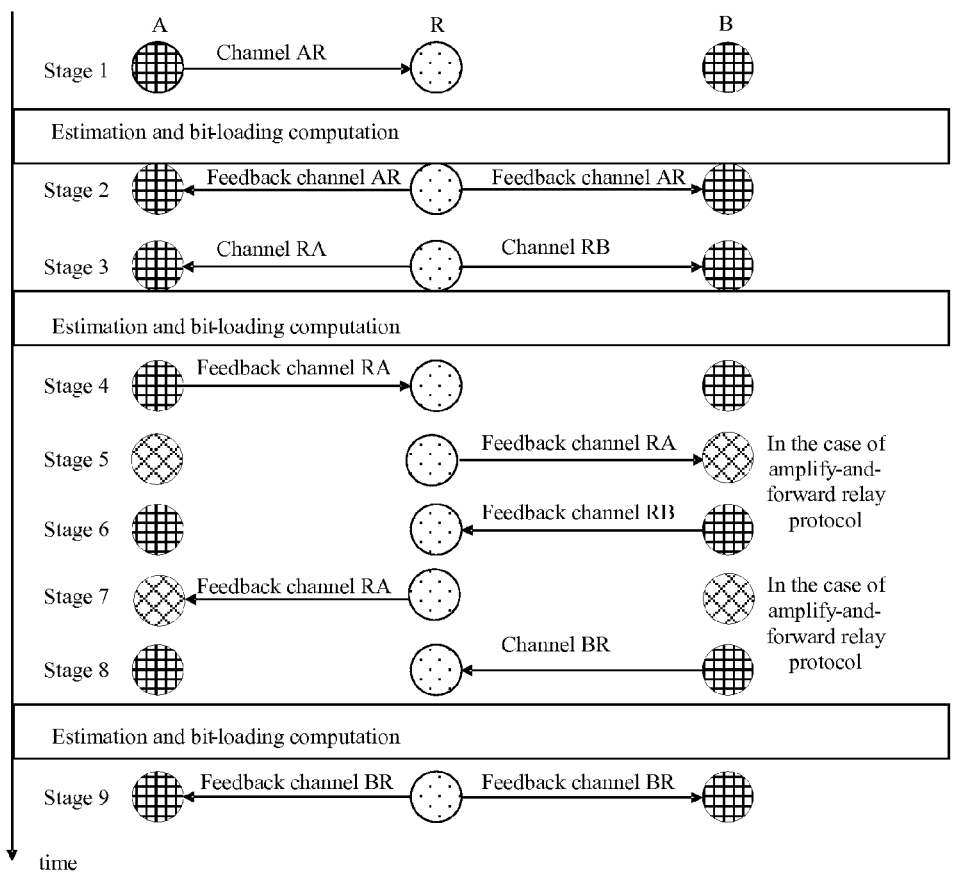
FIG. 3 represents the signaling channels required for a feedback protocol in conventional multi-node communication.

In a multi-node communication, the conventional feedback protocols are applied separately for all of the channel links individually. This will introduce a considerable feedback problem and produce higher latency. The required signaling channels for this scenario are represented in FIG. 3.

It is an advantage of the invention that network resources can be used more efficiently, by carrying out data relaying at the relay points bidirectionally.

The present invention is based inter alia on the insight that simultaneous transmission of different signals does not necessarily obscure the content of the message, because a transmitter can use its own copy of the transmitted message as a filter to extract the peer's message from the combined transmission.

European patent application no. 113055867 in the name of the present Applicant, unpublished at the time of filing of the present application, describes a method and apparatus for providing bidirectional communication between segments of a home network. The described method for providing bidirectional communication between segments of a home network, which may be applied to the present invention by implementing the function of the inter-domain bridge at the relay, comprises receiving a first communication signal at a first interface of an inter-domain bridge during a first time interval; receiving a second communication signal at a second interface of said inter-domain bridge during said first time interval; generating a superimposed signal of said first communication signal and said second communication signal; and transmitting said superimposed signal through said first interface and said second interface during a second time interval, said second time interval occurring after said first time interval.

The invention is also based on the insight of the inventor that end nodes in a relay-based PLC communication process can be relieved by concentrating resource-intensive processes in the relay. This has the effect of leaving more processing power and/or battery life available at the end node for the exchange of user data.

Embodiments of the present invention are based on the further insight of the inventor that the exchanges taking place in a multipoint-to-multipoint communication across a given relay can be grouped according to the pair of nodes involved in each exchange, regardless of which member of the pair is the transmitter and which one is the receiver. In a network with N nodes connected to the repeater, N(N−1)/2 such pairs can be identified (as opposed to the N(N−1) pairs required if messages passing in different direction between the same two nodes were distinguished). At the relay, these N(N−1)/2 conversations can be multiplexed on the medium by any of the known means (e.g. frequency division multiplexing or code division multiplexing) without regard to the direction of the respective messages, because within each conversation, the end points have full knowledge of the message they sent to their peer, and are therefore able to extract the incoming message from the superimposed signal representing the conversation in question.

Figure 4:
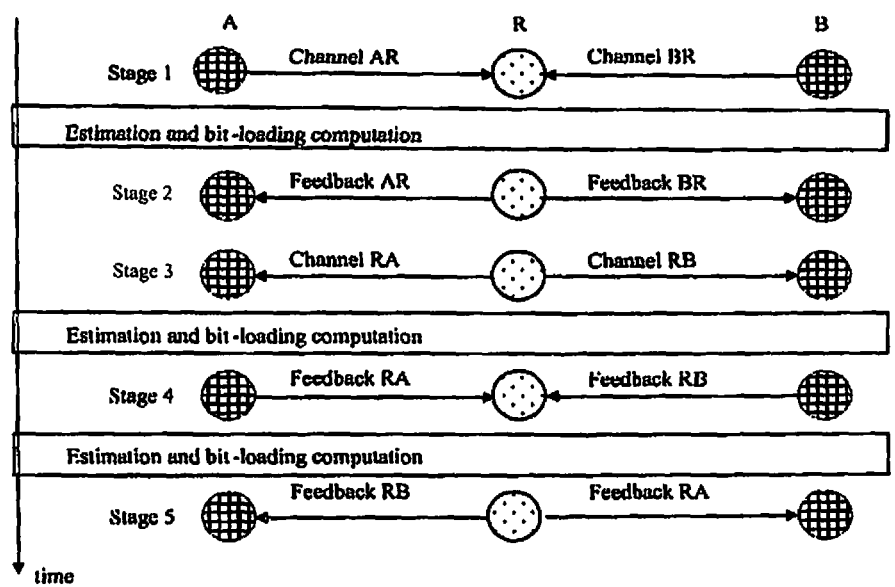
FIG. 4 represents the signaling channels required for a feedback protocol in conventional multi-node communication in an embodiment of the present invention.
Figure 5:
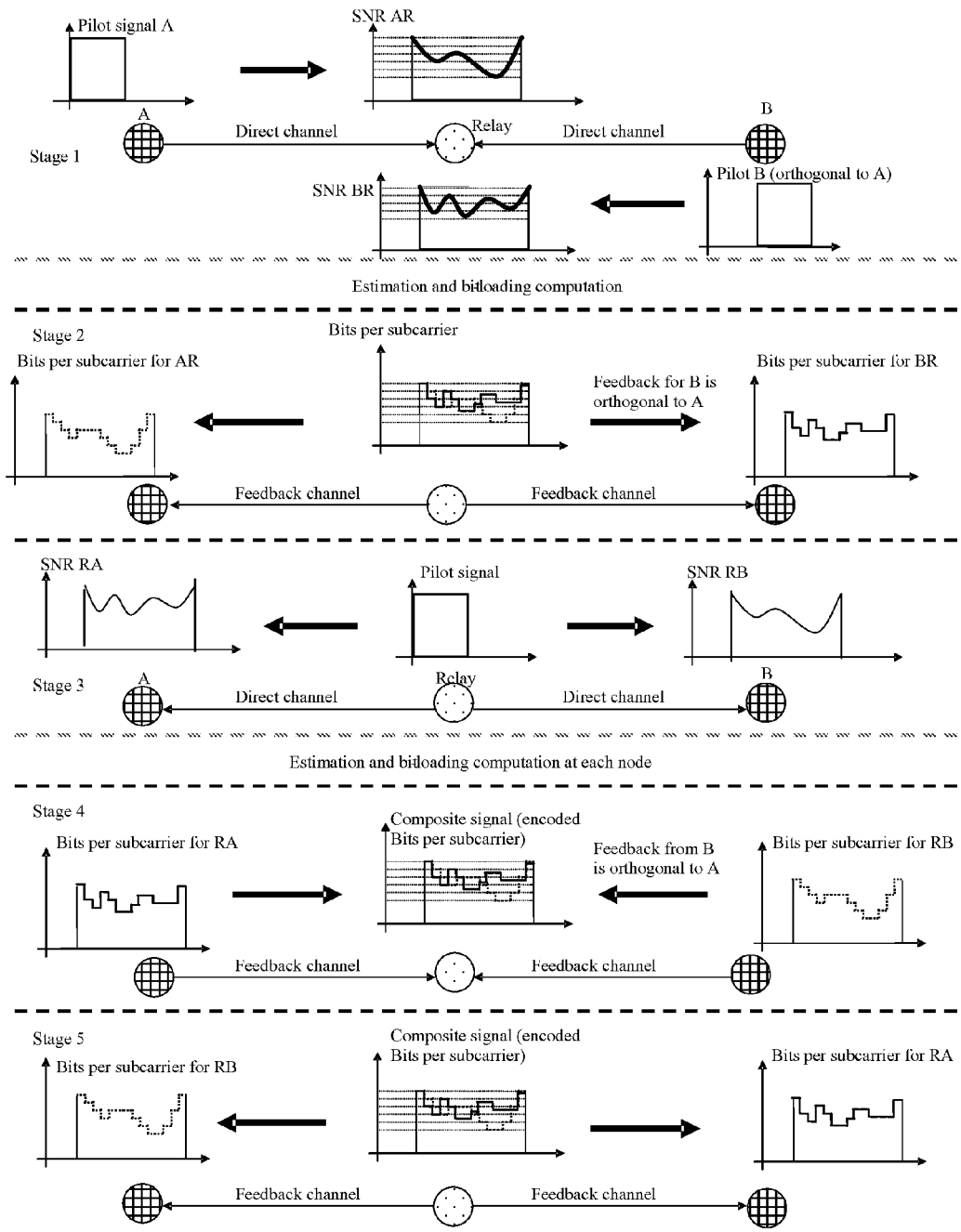
FIG. 5 schematically illustrates a bit-allocation procedure according to an embodiment of the present invention, with processing performed at a relay node.

An embodiment of the present invention will now be described with reference to FIGS. 4 and 5. Without loss of generality, the invention will be described in the context of a bit loading algorithm. The skilled person will appreciate that the same considerations apply to other feedback protocols.

We consider a PLC system where two devices A and B communicate over the relay R in a home network environment. European patent application no. 113061766 in the name of the present Applicant, unpublished at the time of filing of the present application, describes a method and apparatus for assessing the quality of a communication channel in a multi-domain network. That method may be used to obtain the required channel and noise estimates within the power line channel, and the content of the cited application is expressly incorporated by this reference for the purpose of disclosing that aspect of the invention.

The various stages are now described in more detail.

[Stage 1]

In the first stage, devices A and B send their pilot signals PA and PB, respectively, to the relay in the same reserved time slot (for this time reservation protocol can be used). The pilot signals PA and PB from both devices are designed in such way to avoid interference at the relay during the first stage, since both devices access the channel at the same time. The pilot signals can be designed either by phase/frequency shifting one of the pilots (e.g., PB) in comparison with PA and consequently, their time domain estimates will not overlap. With adequate filtering, the two sets of channel information can be separated in the time-domain and used for further signal processing (i.e., pilot B is selected to be orthogonal to pilot A). The skilled person will appreciate that other applicable PLC channel estimation methods may also be used.

The SNR may be calculated for each of the subcarriers on the basis of the estimated channels and their corresponding noise estimates. The bit-loading tables are constructed on the basis of the computed SNR, such that higher SNR regions carry a larger number of bits. For clarity purposes, the illustrated example represents a simple approach, where the estimated SNR A and SNR B are divided into regions by dashed horizontal lines and for each region a number of bits is allocated depending on the average power level. More complex algorithms may also be used with this protocol.

The relay first forms a signal composed of two orthogonal sets corresponding to two bit-loading tables AR and BR. This may be done in the same fashion as in multi-user wireless downlink where users are separated by their corresponding orthogonal codes, or by spectrum shifting as shown in stage 1. The code table with registered nodes is known and exchanged by all devices in the network.

[Stage 2]

The relay encodes the combined signal with a robust modulation scheme and broadcasts the signal over the medium, where all the nodes are listening. The composite signal at each of the nodes is processed to extract and decode the bit-allocation table from the other end's node.

[Stage 3]

At this stage, the relay broadcasts its pilot signal into the medium. The pilot signal is received by all nodes connected to the network and the corresponding channel with noise is estimated. For the channel and noise estimation in this case, simple reverse modulation is sufficient. This is done directly from the received signal since there is no interference from other nodes (all nodes are listening to R broadcast). Now the same procedure is performed as in the last paragraph of stage 1.

[Stage 4]

At this stage, the same procedure is performed as in stage 1, but the transmitted signals from A and B are encoded bit-loading tables RA and RB, respectively. The difference is that the encoded signal at one of the nodes is processed in time to avoid the signal spectrum overlapping at R. The processing at the relay is done to "de-noise" and separate the signals corresponding to bit-loading tables RA and RB. De-noising of the received signal is required to reduce the uncertainty due to noise from RA and RB links. Otherwise, large errors may occur in the feedback channel. After that, the new composite signal is generated and broadcast over the medium, as was done in stage 2 (i.e., with codes or orthogonally).

[Stage 5]

Finally, the nodes A and B receive the composite signal and extract the bit-loading tables RB and RA, respectively. The procedure in this stage is similar to the one in stage 2.

Figure 6:
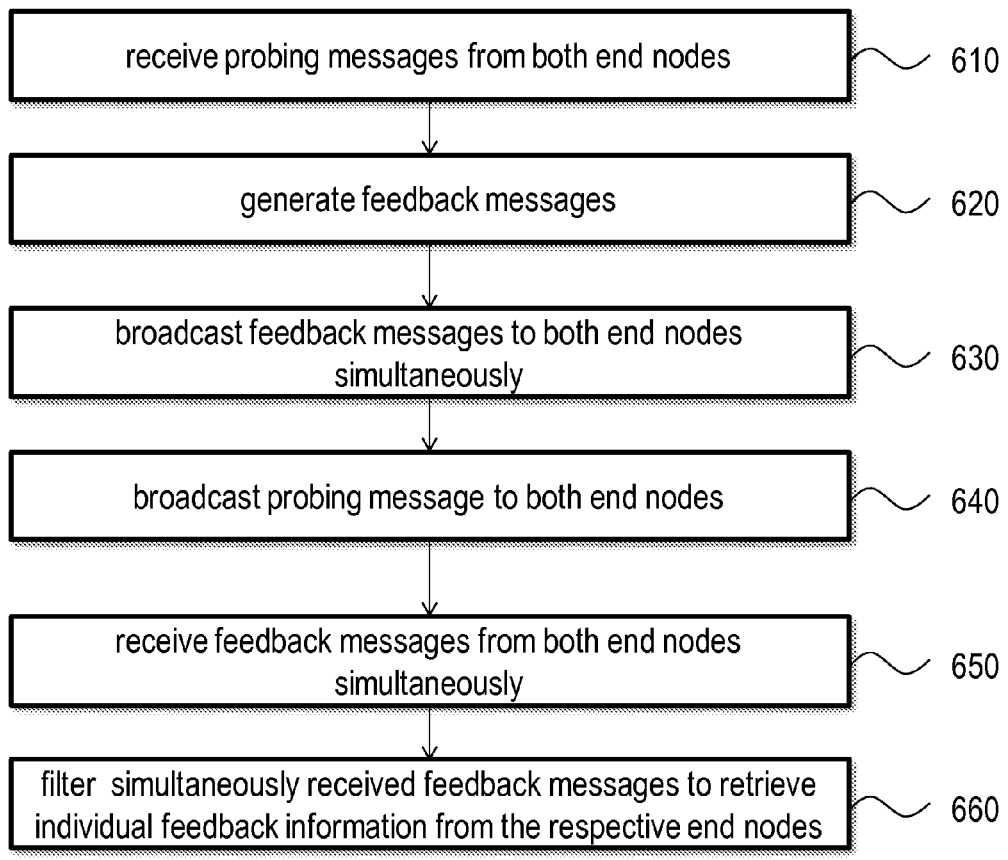
FIG. 6 provides a flow chart of a method according to an embodiment of the present invention.

In FIG. 6, the invention is further illustrated by steps 610-630 of the flow chart, which steps are understood to be performed at a relay node. For simplicity reasons, but without loss of generality, two end nodes are assumed. In a first step 610, representing a first time slot, the relay node receives respective first probing messages from both end nodes substantially simultaneously. These first probing messages, which are designed to avoid interference, are processed 620 to generate respective first feedback messages. In the third step 630, representing a second time slot, the respective first feedback messages are broadcast substantially simultaneously (using orthogonal signals) to the at least two end nodes.

In the optional further steps 640-660, the process is repeated with respect to the reverse channel. A second probing message is broadcast 640 to the end nodes in a third time slot. The end nodes generate their feedback (not shown), and the respective second feedback messages are received 650 substantially simultaneously from the end nodes at the relay, in a fourth time slot. The second feedback messages are again formed as orthogonal signals. This allows the relay to demultiplex 660 these messages and retrieve the information contained in them.

The illustrated flow chart may apply to the bit loading algorithm described above, as well as to other feedback protocols.

Although methods and apparatus have been described hereinabove as separate embodiments, this is done for clarity purposes only, and it should be noted that features described only in connection with method embodiments may be applied in the apparatus according to the present invention to obtain the same technical effects and advantages, and vice versa.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for relaying messages in a PLC network, the PLC network including a relay node and at least two end nodes attached to said relay node, the method comprising:
   receiving respective first probing messages from said at least two end nodes at said relay node;
   processing said respective first probing messages at said relay node to generate respective first feedback messages; and
   broadcasting said respective first feedback messages at said relay node to said at least two end nodes;
   wherein,
      said first probing messages are formed as orthogonal signals and received substantially simultaneously in a first time slot, such that the first probing messages are transmitted during a common time slot, and
      said first feedback messages are formed as orthogonal signals and broadcast substantially simultaneously in a second time slot, such that the first feedback messages are transmitted during a separate common time slot.

2. The method according to claim 1, further comprising at said relay node:
   broadcasting a second probing message to said at least two end nodes in a third time slot; and
   receiving respective second feedback messages from said at least two end nodes;
   wherein said second feedback messages are formed as orthogonal signals and broadcast substantially simultaneously in a fourth time slot.

3. The method according to claim 1, wherein said probing messages are pilot messages, wherein said feedback messages comprise bit loading tables.

4. The method according to claim 1, wherein said first probing messages are formed as orthogonal signals by applying a relative phase/frequency shift.

5. The method according to claim 1, wherein said first feedback messages are formed as orthogonal signal by applying a relative phase/frequency shift.

6. The method according to claim 1, wherein said first feedback messages are formed as orthogonal signal by applying respective spreading codes.

7. The method according to claim 6, wherein individual ones of said spreading codes are assigned to sets of two end nodes.

8. A non-transitory computer-readable storage medium storing a computer-executable program of instructions, the program of instructions being executable by a computer system to cause the computer system to perform the method of claim 1.

9. A relay apparatus comprising an interface for exchanging messages with a PLC network and a processor operatively connected to said interface, wherein said processor is configured to carry out the method of claim 1.

10. An apparatus, comprising:
   a memory storing computer-readable instructions; and
   a processor configured to execute the computer-readable instructions to,
   receive respective first probing messages from at least two end nodes, wherein said first probing messages are formed as orthogonal signals and received substantially simultaneously in a first time slot such that the first probing messages are transmitted during a common time slot;
   process said respective first probing messages to generate respective first feedback messages; and
   broadcast said respective first feedback messages to said at least two end nodes, wherein said first feedback messages are formed as orthogonal signals and broadcast substantially simultaneously in a second time slot, such that the first feedback messages are transmitted during a separate common time slot.

* * * * *